3,174,801
ROTARY BORING HEAD HAVING HELICAL CONVEYING WEBS
Malcolm Noel Mayes Owen, Llanelly, Wales, and Gordon Bertram Dawson, Ashby-de-la-Zouch, England, assignors to Crawley Industrial Products Limited, Sussex, England, and Coal Industry (Patents) Limited, London, England
Filed Feb. 25, 1963, Ser. No. 260,484
Claims priority, application Great Britain, Mar. 9, 1962, 9,131/62
1 Claim. (Cl. 299—87)

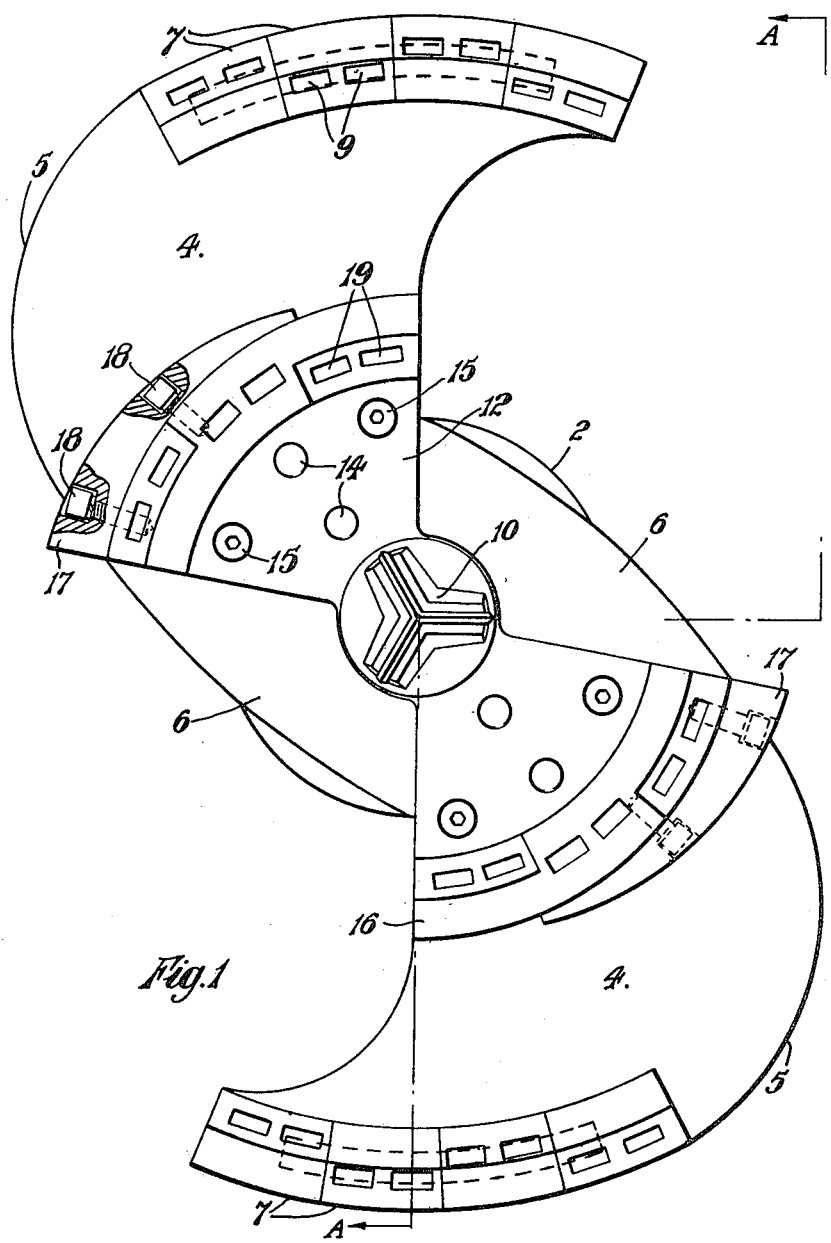

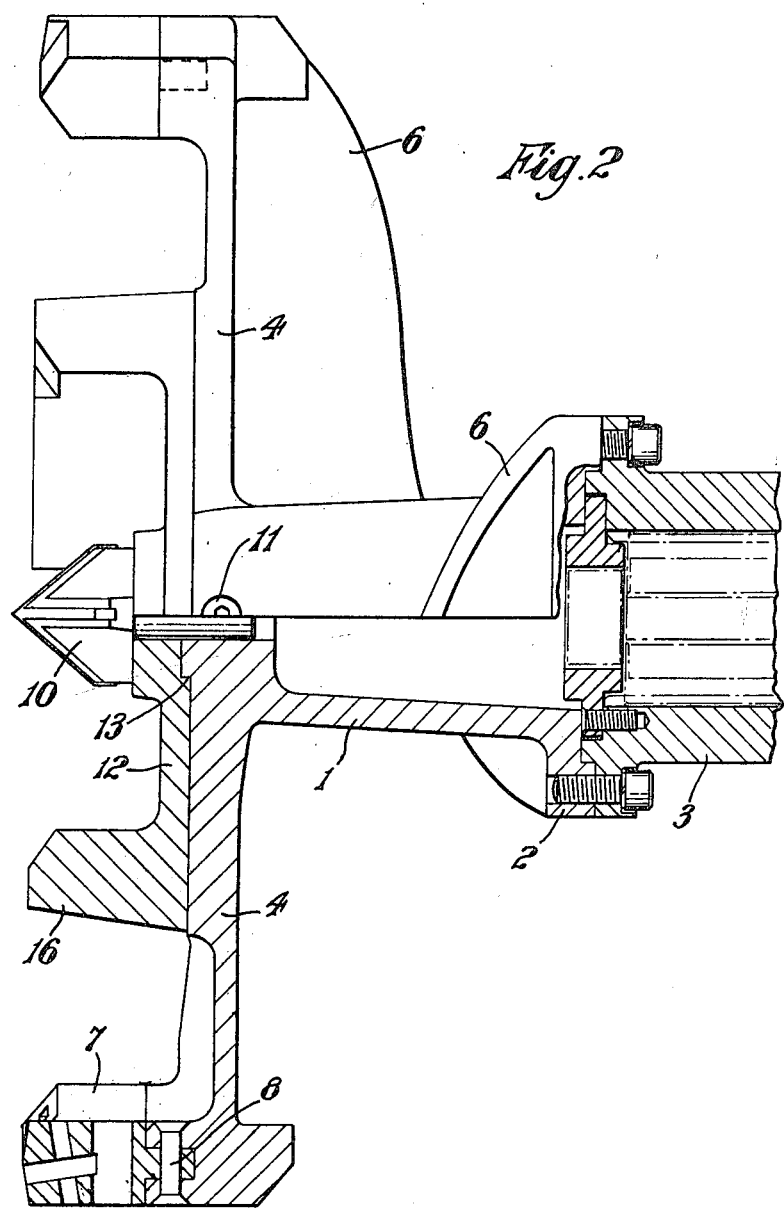

This invention relates to cutting tools for coal cutting machines and provides a rotary boring head for carrying forwardly-directed picks designed to cut in circular paths.

According to the invention, a rotary boring head, for a coal cutting machine, comprises a central arbor having a forward end, cutter-carrying arms radiating from the forward end of the arbor and webs each extending in spiral helical form rearwardly from one of the arms respectively to the arbor.

The spiral-helical webs form coal-collecting and conveying scrolls which, as the cutting head rotates, draw cut and broken coal rearwardly to feed it to a conveyor leading from the coal cutting machine.

In a preferred construction, the radial arms are designed for the mounting thereon of cutters which project forwardly at the periphery and at an intermediate radius, to provide respectively a peripheral kerf cutter and a core-breaker kerf cutter.

At the central junction of the radial arms, provision is made for the mounting of a centre boring bit and preferably the peripheries of the radial arms are also designed to form or for the attachment of circumferential cutters to ensure clearance for axial withdrawal of the boring head from a coal face into which it has penetrated.

A preferred construction including further features of the invention, as defined in the appended claim, is illustrated on the accompanying drawings, in which:

FIG. 1 is a front elevation of the boring head and
FIG. 2 is a sectional side elevation on the line A—A of FIG. 1.

As can be seen in FIG. 2, the main component of the boring head is a casting which has a central arbor portion 1 on the rear end of which there is a flange 2 for attachment by bolts to the forward end of the rotary shaft 3 of the coal cutting machine.

From the forward end of the arbor 1 extends a diametral pair of transversely radial arms 4, of sickle shape in front elevation (FIG. 1), and from the convex trailing edge 5 of each of these arms a web 6 extends rearwardly in spiral helical form, through somewhat more than 180°, to join the arbor 1 along and around its length and terminate at the flange 2.

At the periphery of each radial arm 4, a forwardly-directed cutting head, to cut on a circular path, is formed by rim segments 7 removably held by rivets 8 and having sockets 9 for the mounting of four pairs of cutter picks (not shown) alternating at different radii and forming a kerf cutter.

The radial arm peripheries are provided with means for mounting circumferential cutters so that upon rotation of the boring head, a circumferential cut can be made to ensure that the boring head can be withdrawn axially from the coal face. Such circumferential cutters may conveniently be suitably shaped picks mounted in the radially outermost of the sockets 9.

At the central junction of the arms 4, a central boring bit 10 is inserted axially into an opening formed in the forward end of the arbor 1 and secured by a bolt 11 which registers with bolt holes formed in the arbor 1 and which extends transverse to and through the shank of the said bit 10.

To the front of the inner portions of the radial arms 4, there is secured a core breaker member consisting of a diametral double sector shaped plate 12 with a central hole through which the boring bit 10 extends.

The core breaker plate 12 is centrally located by a shoulder 13 on each arm 4. The arms 4 have dowels 14 which enter holes in the plate 12 which is secured to the arms 4 by bolts 15.

As each periphery, the core breaker plate 12 is formed with an axially-projecting rim segment 16 with sockets 19 for the mounting of three pairs of cutter picks at successively different radii to provide a forwardly-directed kerf cutter at an intermediate radius on each arm 4.

To each rim segment 16 of the core breaker plate 12, a circumferential clearing tool 17 is secured by studs 18.

It will be appreciated that the actual types and form of boring, cutting and breaking bits used will be selected to suit the coal being worked, the construction of boring head provided by the invention enabling the necessary changes to be made by replacement of removable parts on the main component.

We claim:
A rotary boring head for a coal cutting machine, comprising a central arbor having a forward end, a single diametral pair only of transversely radial arms radiating from said forward end, each said arm being of sickle shape in front elevation and thereby having a convex trailing edge, centre mounting means at the centre of said arms for mounting a centre boring bit co-axially in said arbor, peripheral and intermediate mounting means on said arms for the mounting thereon of cutters at the peripheries of said arms and at an intermediate radius thereof respectively, the said peripheral mounting means of each arm being laterally offset from the appertaining intermediate mounting means in the direction of rotation of the head, and a pair of webs, each web respectively extending rearwardly from the trailing edge of one of said arms in spiral helical form and joining said arbor along and around the length thereof.

References Cited by the Examiner
UNITED STATES PATENTS

| | | | |
|---|---|---|---|
| 1,604,896 | 10/26 | Foltz | 175—323 X |
| 2,239,461 | 4/41 | Mann | 175—323 X |
| 2,734,733 | 2/56 | Wilms. | |
| 2,753,167 | 7/56 | Brown. | |
| 2,912,228 | 11/59 | Kandle | 175—391 |
| 2,925,259 | 2/60 | Brown. | |
| 2,940,740 | 6/60 | Adams. | |
| 2,981,403 | 4/61 | Goodrich | 175—323 X |
| 3,092,190 | 6/63 | Gruere | 175—173 |

BENJAMIN HERSH, *Primary Examiner.*